US008039047B2

(12) United States Patent
Sepeur et al.

(10) Patent No.: US 8,039,047 B2
(45) Date of Patent: Oct. 18, 2011

(54) COATING FOR PERMANENT HYDROPHILIZATION OF SURFACES, AND ITS USE

(75) Inventors: Stefan Sepeur, Wadgassen (DE); Nicole Dräger, Marpingen (DE); Stefan Goedicke, Neunkirchen (DE); Carolin Thurn, Wadgassen (DE)

(73) Assignee: GXC Coatings GmbH, Goslar (DE)

( * ) Notice: Subject to any disclaimer, the term of this patent is extended or adjusted under 35 U.S.C. 154(b) by 219 days.

(21) Appl. No.: 11/983,907

(22) Filed: Nov. 13, 2007

(65) Prior Publication Data
US 2008/0090019 A1    Apr. 17, 2008

Related U.S. Application Data

(60) Division of application No. 10/856,374, filed on May 28, 2004, now abandoned, which is a continuation of application No. PCT/DE02/04371, filed on Nov. 28, 2002.

(30) Foreign Application Priority Data

Nov. 29, 2001 (DE) .................................. 101 58 437

(51) Int. Cl.
B05D 5/06 (2006.01)

(52) U.S. Cl. .................. 427/165; 427/163.1; 427/397.7; 427/427.4

(58) Field of Classification Search .................. 427/165, 427/163.1, 397.7, 427.4
See application file for complete search history.

(56) References Cited

U.S. PATENT DOCUMENTS

| 2,870,108 | A |   | 1/1959 | Nickerson |
| 4,462,842 | A |   | 7/1984 | Uchiyama et al. |
| 4,830,672 | A |   | 5/1989 | Yamada et al. |
| 5,199,979 | A |   | 4/1993 | Lin et al. |
| 5,723,181 | A |   | 3/1998 | Roberts |
| 5,753,373 | A |   | 5/1998 | Kausch et al. |
| 5,908,663 | A |   | 6/1999 | Wood et al. |
| 5,997,621 | A | * | 12/1999 | Scholz et al. ............ 106/13 |
| 6,022,400 | A |   | 2/2000 | Izumi et al. |
| 6,045,903 | A | * | 4/2000 | Seino et al. .............. 428/331 |
| 6,136,083 | A |   | 10/2000 | Kalleder et al. |
| 6,165,256 | A |   | 12/2000 | Hayakawa et al. |
| 6,296,943 | B1 |  | 10/2001 | Iijima et al. |
| 6,736,997 | B2 |  | 5/2004 | Olding et al. |
| 6,872,765 | B1 |  | 3/2005 | Betz et al. |

FOREIGN PATENT DOCUMENTS

| DE | 21 19 349 | 11/1972 |
| DE | 197 46 885 | 6/1999 |
| EP | 188 419 | 7/1986 |
| EP | 219 039 | 4/1987 |
| EP | 339 909 | 4/1989 |
| EP | 0 391 226 | 10/1990 |
| EP | 0 869 156 | 10/1998 |
| EP | 0 909 784 | 4/1999 |
| EP | 0 989 166 | 3/2000 |
| EP | 1 094 090 | 4/2001 |
| JP | 54119599 | 9/1979 |
| JP | 62129367 | 6/1987 |
| JP | 3247672 | 1/1991 |
| JP | 2169651 | 6/1999 |
| WO | WO 87/01111 | 2/1987 |

* cited by examiner

Primary Examiner — Frederick Parker
(74) Attorney, Agent, or Firm — Collard & Roe, P.C.

(57) ABSTRACT

A coating for permanent hydrophilization of surfaces and its use are provided. The coating is made of nano-scale particles having hydrophilic side chains, which can be sintered. The coating may be made of 10 to 90% inorganic structures, 5 to 70% hydrophilic side chains, and 0 to 50% organic side chains having functional groups.

11 Claims, No Drawings

COATING FOR PERMANENT HYDROPHILIZATION OF SURFACES, AND ITS USE

CROSS REFERENCE TO RELATED APPLICATIONS

This application is a divisional of and Applicant claims priority under 35 U.S.C. §120 and 121 of parent U.S. patent application Ser. No. 10/856,374 filed May 28, 2004, now abandoned, which is a continuation under 35 U.S.C. §120 of International Application No. PCT/DE02/04371 filed Nov. 28, 2002, which claims priority from German No. 101 58 437.7 filed Nov. 29, 2001.

BACKGROUND OF THE INVENTION

1. Field of the Invention

The invention relates to a coating for permanent hydrophilization of surfaces, and its use.

2. Description of Related Art

Different material approaches are known for permanent hydrophilization of surfaces.

One such approach is the use of hydrophilic polymers as a coating material for glass and plastic surfaces (e.g. ski goggles). Transparent anti-fog coatings for polycarbonate surfaces, based on polyurethanes, are known. Polyurethanes can be provided with relatively high surface energies, by means of polar structures. This results in a relatively high water absorption of the polymer, which leads to adsorbed water layers on the surface, i.e. hydrophilic behavior. The high water absorption of hydrophilic polymers frequently results in loosening of the adhesion of the layers, in the case of a long-term effect.

A coating material having anti-fog properties is known from WO 87/01111, whereby polyethylene glycol or ethylene glycol is built into a polyurethane matrix that is established during curing, as an additionally hydrophilizing component. Based on the indicated water absorption of the material, at 45%, loosening of the adhesion of the layer after long-term exposure to water can be expected.

A UV-curing anti-fog coating material for polymethacrylic surfaces, based on a copolymer of hydroxyethyl methacrylate and methyl methacrylate, trimethylol propane triacrylate as well as methyl cellulose and a UV radical starter is described in JP 3247672 A1. After curing, the hydrophilic components (OH group of hydroxyl methacrylate, methyl cellulose) are enriched on the surface, because of thermodynamic forces, and the non-polar components are enriched on the non-polar PMMA surface.

A copolymer is known from EP 339 909 A1, which is produced from a polyol diepoxy, hydroxyethyl methacrylate, and methyl cellulose. Such layers do not fog up within 10 hours at 100% relative humidity/60° C. However, long-term resistance of these surfaces is not described.

Another important area of application for the aforementioned hydrophilic coating materials is the printing industry. Hydrophobic surfaces are hydrophilized by means of the coatings, and can thereby be imprinted with polar printing inks, i.e. these inks can be applied by means of ink-jet technology.

Furthermore, bulk materials having hydrophilic structure elements are used for the production of contact lenses, for which permanent wetting with the eye fluid, i.e. a high level of water absorption, is required.

Adhesion promotion agents based on silanes are used to improve the adhesion of hydrophilic coating materials. For example, a coating material based on acrylic acid, polyethylene glycol monomethyl acrylate, sorbitol polyglycide ether with silane coupling reagents is known from JP 62129367 A1, as an anti-fog coating material for plastics and glass. The transparent layers demonstrate clear swelling, i.e. softening of the material, after being stored in water at 60° C. A hydroxyethyl acrylate/hydroxyethyl methacrylate/vinyl pyrrolidone copolymer, using silane adhesion-promoting agents (amino alkyl-functionalized, methacryl-functionalized, vinyl-functionalized, and mercapto-functionalized alkoxy silanes) are described in JP 54 119599 A1, for the production of hydrophilic plastic surfaces. Comparable materials having hydrophilic polyoxyethylene structures in a methacrylate/hydroxyethyl methacrylate matrix having methacryl-modified trialkoxy silanes as adhesion-promoting agents are described in JP 2 169651 as hydrophilic coating materials for plastic films, for applications in the agricultural sector. Mechanical properties, i.e. scratch resistance and friction wear resistance, are not discussed there.

Another fundamental approach to the hydrophilization of surfaces is building ionic or non-ionic surfactants into coating materials having polar structure elements. On the one hand, ionic surfactants, in particular, can be chemically bonded to appropriate polymers, and produce additional highly polar (hydrophilic) centers, by means of the "hydrophilic head"; on the other hand, non-ionic surfactants can be built in, which accumulate on the interface with the air, because of thermodynamic equilibria, whereby extremely high concentrations of hydrophilic end groups of the surfactants are concentrated at the layer surface and thereby a high level of hydrophilia is achieved (DE 20 68 494 A1). When using non-ionic surfactants, these components possess a diffusion capacity, so that when contact with water occurs, the surfactants are dissolved out of the surface, whereby hydrophobic particles that are adsorbed on the surface are washed away with the surfactants. By means of diffusion, diffusible surfactant molecules are re-supplied to the surface, so that a "self-renewing" hydrophilic surface is formed as a result, until the reservoir of diffusible surfactant molecules in the bulk material has been used up. Coating materials made of difunctional aliphatic isocyanates (e.g. 1,6-hexa-methylene diisocyanate, 2,4-trim-ethyl-1,6-hexamethylene diisocyanate, 3-isocyanatomethyl-3,5,5-trimethyl cyclohexyl isocyanate, etc.), as well as polyfunctional polyalcohols (polyester polyalcohols, polyether polyalcohols, etc.), and ionic or non-ionic surfactants (ethoxylated fatty alcohols) are described in DE 20 68 494 A1, whereby non-anionic surfactants are preferred because of their diffusibility. Such mixtures are particularly applied to transparent plastics, using usual coating techniques, and subsequently polymerized thermally. In addition, there is the possibility of applying and curing the polymer layers without dissolved surfactants, and finally diffusing the surfactants in, in aqueous solution, at elevated temperature (approximately 90° C.), whereby this can be accelerated by means of external pressure. The layers based on polyurethane that are produced demonstrate anti-fog properties (DIN 4646, Part 8) and have improved scratch resistance and friction wear resistance of the surface, as compared with usual transparent layers (scattered light approximately 4% after 100 cycles Taber Abrader); this is attributable to a "self-healing effect" (viscous flow under load) of the elastic polymer.

An anti-fog coating material based on polyvinyl pyrrolidone/polyvinyl acetate/polyethylene glycol copolymers with surfactants based on fatty alcohol ether sulfonic acid is described in DE 21 19 349 A1, which has "permanent" anti-fog properties, whereby it is described that the layers are not resistant to usual cleaning agents.

A transparent material based on polyvinyl pyrrolidone/polydimethyl acrylamide/polyvinyl pyrrolidone copolymers with polymerizable α olefin groups as well as polyisocyanate precursors and non-ionic or anionic surfactants [is described] in EP 188 419 A1. The best results are achieved by using both anionic surfactants that were chemically bonded to the hydrophilic network during the polymerization, and non-ionic surfactants that remain diffusible in the matrix. Excellent adhesion values on transparent polymers (polycarbonate polyester, PMMA, etc.) are described for the coatings. The coatings do not fog up if they are cooled to 0° C. and then exposed to 100% relative humidity. No reduction in the anti-fog properties is found after 20 cycles of this test.

An anti-fog coating material based on hexamethyl cyclotrisiloxane and ionic surfactants based on fatty alcohol ($\geq 50\%$) in alcoholic solutions are known from EP 219 039 A1, whereby the solid material content of the coating solution is $\leq 2\%$. The layers are applied using usual coating techniques, and dried at temperatures between 25 and 50° C. There it is described that after short-term storage of the substrate at $-10°$ C., no fogging occurs in moist air. No information is provided with regard to the durability of the effect or mechanical surface properties.

The state of the art with regard to the production of transparent hydrophilic coating materials can therefore be divided up into two fundamental principles:

1. Organic polymers or copolymers having polar groups, such as COII, COOII, COONII, for example, are used. The layers are applied as a copolymer, or polymerized as a monomer or copolymer mixture, after curing, whereby the materials that have thermally cured after application of the layer demonstrate better mechanical stability, i.e. long-term stability, because of the higher degrees of polymerization or the lower solvent content values. The high concentration of polar groups in the polymers that are used (hydroxyethyl acrylic acid ester, hydroxyethyl methacrylic acid ester, polyurethane, polyethylene glycol, hydroxyethyl cellulose, etc.) results in good wetting properties (low contact angles) with regard to water, and therefore the coated surfaces are hydrophilized. Such layers were particularly developed for coating hydrophobic non-polar polymers, which have a great tendency to fog up, because of their hydrophobic nature. These surfaces demonstrate a low friction wear resistance, for one thing; for another, the network is weakened over time, because of water absorption and swelling, so that swelling and dissolution, i.e. loosening of the layers in the substrate occurs.

2. By installing diffusible surfactants into the aforementioned materials, the hydrophilia can be further increased, since the hydrophilic heads of the surfactants accumulate at the surface, in thermodynamically controlled manner, and therefore a further improvement in the hydrophilic properties of such materials is fundamentally achieved. During the washing process of such surfaces, adsorbed hydrophobic particles are washed away, together with the surfactants that are located at the surface, whereby surfactants are re-supplied to the surface from the bulk material, by means of diffusion, and thereby a self-renewing hydrophilic surface is obtained. A disadvantage in this connection is the fact that after the surfactants are used up, the effect ends, so that no long-term hydrophilia can be achieved in this manner.

In summary, it should be stated that all of the systems having hydrophilic surface properties, as known from the state of the art, lose their adhesion under long-term conditions, because of swelling and diffusion processes, or they dissolve, or they demonstrate limited transparency or hydrophilia that is limited in terms of time.

SUMMARY OF THE INVENTION

It is therefore the task of the invention to create a coating for permanent hydrophilization of surfaces.

This task is accomplished, according to the invention, in that the coating consists of nano-scale particles having hydrophilic side chains, which can be sintered.

Surprisingly, it was possible to implement such a coating, within the scope of the invention, which demonstrates both a very good wettability of the surface by water (contact angle $<30'$ up to the anti-fog effect), on the one hand, and excellent long-term resistance, on the other hand, after simple application (spray, dip, or flow coating) and subsequent thermal compacting. For example, the steam resistance was tested under autoclave conditions (p=3 to 4 bar, T=393 K, t=30 min), and [the coating] passed without any [adverse] findings. The adhesion was very good for all the substrates tested (even for polyolefins after prior flaming).

According to the invention, it is provided that the coating consists of 10 to 90% inorganic structures, 5 to 70% hydrophilic side chains, as well as 0-50% organic side chains having functional groups. All percentages are by weight.

In this connection, it is provided that the inorganic structures are, in particular, silicon dioxide or zirconium oxide.

It is advantageous that the nano-scale particles have an average particle size of 2 to 100 nm, preferably 2 to 30 nm.

Preferred embodiments of the invention consist of the fact that the hydrophilic side chains are amino, sulfonate, sulfate, sulfite, sulfonamide, sulfoxide, carboxylate, polyol, polyether, phosphate, or phosphonate groups.

It lies within the scope of the invention that the functional groups of the organic side chains are epoxy, acryloxy, methacryloxy, glycidyloxy, allyl, vinyl, carboxyl, mercapto, hydroxyl, amide, or amino, isocyano, hydroxy, or silanol groups.

It is practical that the pH of the coating lies between 3 and 10.

Furthermore, it is provided, according to the invention, that the layer thickness of the coating lies between 100 nm and 20 µm, preferably between 250 nm and 5 µm.

Also, the use of the coating according to the invention for coating metals, plastics, ceramics, textiles, leather, wood, paper, varnished surfaces, and glass, as an anti-fog agent, lies within the scope of the invention.

Typical applications, in this connection, are: shoes, articles of clothing, tarps, posters, construction elements (e.g. sun protection plates, window profiles (particularly those made of PVC), greenhouses, glass domes, façade elements, roofing tiles, shutters, chimneys, door and window handles), telephone cells, monuments, satellite systems, antennas, bridges, buildings (particularly high-rise buildings), flower pots, patio furniture, gardening tools, garden gnomes, bus/streetcar stop shelters, telephone poles, power line boxes, roof gutters, playground equipment, headstones, billboards, posters, kitchens and kitchen appliances, cars/trucks and car/truck parts (e.g. car/truck mirrors, car/truck paints, car/truck rims, car/truck windows, bumpers, car tarps, car/truck license plates), traffic signs, traffic mirrors, bicycles, motorcycles, spaceships, airplanes and airplane parts, helicopters, satellites, space suits, medical equipment, medical rooms and sanitary fittings, condoms, implants, dialysis equipment, catheters, endoscopes, swimming pools, tents, solar systems and solar cells, electric and electronic components (e.g. wires, cables, lamps, lanterns, measuring equipment), computer displays, optical lenses, or machine parts.

The production of the coating according to the invention fundamentally takes place in that first, nanoparticles are produced, these are stabilized in a solvent (electrosterically or electrostatically), then applied to a substrate (for example by means of spraying, overflow, dipping), and then cured (thermally, with light, by means of radiation curing, etc.).

In this process, transparent, highly resistant coatings are formed, having nanoparticles that are cross-linked with one another by means of the curing process.

DETAILED DESCRIPTION OF PREFERRED EMBODIMENTS

In the following, exemplary embodiments of the invention will be described.

Exemplary Embodiment 1

221.29 g (1 mol) 3-aminopropyl triethoxy silane are added to 444.57 g sulfosuccinic acid, while stirring, and heated to 120° C. in a silicone bath for 5 h. After the reaction mixture has cooled, 20 g of the viscous fluid are mixed with 80 g (0.38 mol) tetraethoxy silane, and absorbed in 100 g ethyl alcohol. The solution is then mixed with 13.68 g (0.76 mol) of a 0.1 N HCl solution, and tempered in a water bath overnight, at 40° C. This results in hydrophilic nanoparticles having reactive end groups of approximately 2 nm.

The resulting solution is diluted with a mixture of ⅓ water and ⅔ N-methyl pyrrolidone (NMP), to a solid substance content of 5%, and applied to a glass plate by spraying, in a wet film thickness of 10 to 20 μm. Subsequently, the substrate is compacted in a circulating air drying cabinet for 3 h, at 150° C.

The resulting layer demonstrates a contact angle with regard to water of approximately 10°, and a very good anti-fog effect, which is stable over the long term.

Exemplary Embodiment 2

221.29 g (1 mol) 3-aminopropyl triethoxy silane are added to 444.57 g sulfosuccinic acid, while stirring. Then the solution is heated to 130° C. in a silicone bath. After a reaction time of 1 h, 332.93 g of an alkaline-stabilized aqueous silica gel solution of the Levasil 300/30% type (pH=10) are added to the reaction solution, while stirring. After a reaction time of 12 h, the mixture is diluted with water, to a solid substance content of 5%. This results in hydrophilic nanoparticles having reactive end groups of approximately 15 nm. The system is applied to plasma-activated polycarbonate sheets by means of overflow, and subsequently dried in a circulating air drying cabinet for 5 h, at 130° C.

The resulting layer demonstrates a contact angle with regard to water of approximately 10°, and a very good anti-fog effect, which is stable over the long term.

Exemplary Embodiment 3

123.68 g (0.5 mol) 3-isocyanatopropyl triethoxy silane are added to 600 g (1 mol) polyethylene glycol 600, and heated to 130° C. in a silicone bath, after adding 0.12 g dibutyl tin laurate (0.1 wt.-% with regard to 3-isocyanatopropyl triethoxy silane). 25 g (0.12 mol) tetraethoxy silane and 33.4 g (0.12 mol) 3-glycidyloxy propyl triethoxy silane are added to 50 g of the resulting solution (solution A), while stirring. After adding 15.12 g (0.84 mol) of a 0.1 N HCl solution, the mixture is hydrolyzed and condensed at room temperature for 24 h. This results in hydrophilic nanoparticles having reactive end groups of approximately 5 nm.

After dilution of the mixture with isopropanol, in a ratio of 1:1, and subsequent spray application onto a glass plate, compacting of the material takes place at a surface temperature of max. 200° C., under IR emitters, for 10 min.

The resulting layer demonstrates a contact angle with regard to water of approximately 10°, and a very good anti-fog effect, which is stable over the long term.

Exemplary Embodiment 4

12.5 g (0.05 mol) 3-methacryloxy propyl trimethyloxy silane, 12.5 g of a 20% aqueous $CeO_2$ solution (from Aldrich), and 50 g ethyl alcohol are added to 50 g of the solution A described in Exemplary Embodiment 3, while stirring, in order to homogenize the mixture, and hydrophilization takes place for 48 h. After adding 0.375 g Ingacure 184 from Ciba Spezialitaten Chemie (3 wt.-% with reference to 3-methacryloxy propyl trimethoxy silane), the mixture is applied to a flamed polycarbonate sheet by means of spraying, in a wet film thickness of at most 30 μm, and first dried thermally in a circulating air drying cabinet at 130° C. for 10 min. This is followed by photochemical drying with Hg emitters having a radiation output of 1-2 $J/cm^2$.

The resulting layer demonstrates a contact angle with regard to water of approximately 10°, and a very good anti-fog effect, which is stable over the long term.

The invention claimed is:

1. A method of manufacturing a coating for hydrophilizing a surface comprising the following steps:
    (a) providing a coating solution comprising nano-scale particles stabilized in a solvent, the nano-scale particles having hydrophilic side chains and an average particle size of 2 to 100 nm;
    (b) applying the coating solution to a substrate; and
    (c) curing the coating solution to form a coating made up of 10 to 90 wt. % inorganic structures, and 5 to 70 wt. % hydrophilic side chains, and 0-50 wt. % organic side chains having functional groups.

2. The method according to claim 1, wherein the nanoparticles have an average particle size of 2 to 30 nm.

3. The method according to claim 1, wherein the inorganic structures are silicon dioxide or zirconium oxide.

4. The method according to claim 1, wherein the hydrophilic side chains are amino, sulfonate, sulfate, sulfite, sulfonamide, sulfoxide, carboxylate, polyol, polyether, phosphate, or phosphonate groups.

5. The method according to claim 1, wherein the coating formed from curing the coating solution comprises organic side chains having functional groups in an amount no greater than 50 wt. %.

6. The method according to claim 1, wherein the nano-scale particles are stabilized electrosterically or electrostatically in the solvent.

7. The method according to claim 1, wherein the coating solution is applied to the substrate by spraying, flow-coating, or dipping.

8. The method according to claim 1, wherein the coating has a layer thickness between 100 nm and 20 μm.

9. The method according to claim 8, wherein the coating has a layer thickness between 250 nm and 5 μm.

10. The method according to claim 8, wherein curing of the coating solution to form the coating is done thermally or by radiation.

11. The method according to claim 5, wherein the functional groups of the organic side chains are epoxy, acryloxy, methacryloxy, glycidyloxy, allyl, vinyl, carboxyl, mercapto, hydroxyl, amide or amino, isocyano, or silanol groups.

* * * * *